United States Patent [19]

Hecklinger et al.

[11] 3,965,247

[45] June 22, 1976

[54] RECOVERY OF SODIUM NITRITE FROM BY-PRODUCT PROCESS LIQUORS CONTAINING SODIUM CHLORIDE

[75] Inventors: Clarence Frederick Hecklinger, Camillus; Donald Edward Crook, Auburn, both of N.Y.

[73] Assignee: Allied Chemical Corporation, New York, N.Y.

[22] Filed: June 20, 1975

[21] Appl. No.: 588,740

[52] U.S. Cl. .............................. 423/385; 423/499; 23/296; 23/302 R; 23/303
[51] Int. Cl.² ........................................ C01B 21/50
[58] Field of Search ............... 423/385, 499; 23/296, 23/302 R, 303 R

[56] References Cited
UNITED STATES PATENTS

| | | | |
|---|---|---|---|
| 910,530 | 1/1909 | Halvorsen | 423/385 |
| 991,356 | 5/1911 | Pauling | 423/385 |
| 2,032,699 | 3/1936 | Hayes et al. | 423/385 |

Primary Examiner—Earl C. Thomas
Attorney, Agent, or Firm—Gerhard H. Fuchs; Jack B. Murray, Jr.

[57] ABSTRACT

According to the present invention, sodium nitrite is recovered from an aqueous solution containing dissolved sodium nitrite and sodium chloride by a process which comprises subjecting said solution to crystallization in a first crystallization zone under conditions sufficient to effect crystallization of sodium chloride, including operating at temperatures of from about 110° to 130°C, to produce a first slurry containing sodium chloride crystals; separating said crystals from said first slurry to produce a solution containing dissolved sodium nitrite; subjecting said sodium nitrite solution to crystallization in a second crystallization zone under conditions sufficient to effect crystallization of sodium nitrite from said solution, including operating at temperatures of from about 10° to 60°C, to form a second slurry containing sodium nitrite crystals; and recovering said sodium nitrite crystals from said second slurry.

10 Claims, No Drawings

RECOVERY OF SODIUM NITRITE FROM BY-PRODUCT PROCESS LIQUORS CONTAINING SODIUM CHLORIDE

BACKGROUND OF THE INVENTION

1. Field of the Invention

This invention relates to the production of sodium nitrite and more particularly to the recovery of sodium nitrite from aqueous sodium nitrite solutions containing sodium chloride impurities.

2. Description of the Prior Art

It is well known that if nitrous gases, i.e. gases containing nitric oxide and nitrogen dioxide, are brought into contact with alkaline aqueous solutions, the nitric oxide and nitrogen dioxide will be absorbed with the formation of nitrites and nitrates. See U.S. Pat. Nos. 1,903,815 and 1,978,431. Such gases are typically obtained from a wide variety of sources, as for example, by the arc process of nitrogen fixation, by the air-oxidation of ammonia or as waste gases from an absorption process of which nitric acid is the primary product. By controlling the ratio of nitric oxide and nitrogen dioxide so that more nitric oxide than nitrogen dioxide is present in the gas feed, the amount of nitrates that is formed can be minimized, thereby allowing maximum conversion of the nitrogen oxide to the nitrites.

In such processes nitrous gases are contacted for absorption in one or more stages with a liquid medium maintained alkaline by the presence of suitable alkaline reacting agents, e.g. sodium hydroxide, sodium carbonate, sodium bicarbonate and mixtures thereof. The liquor, herein termed the "final absorption liquor", which is separated from the last absorption stage contains dissolved sodium nitrite together with sodium nitrate and minor amounts of unreacted alkaline reacting agent. Further, use of a nitrous gas feed containing carbon dioxide will also cause the finished absorption liquor to contain sodium carbonate/bicarbonate values due to the absorption of $CO_2$ in the aqueous medium.

The final absorption liquor is passed on to an evaporator crystallizer for evaporation of at least a portion of the water content of the final absorption liquor, thereby producing a liquor, herein termed the "draw slurry", containing sodium nitrite solids. The draw slurry is then passed to a solid separator to remove sodium nitrite crystals substantially free of other components of the liquor as product. The mother liquor (herein termed the "draw slurry mother liquor") which is obtained following the separation of the product sodium nitrite crystals from the draw slurry, still contains substantial amounts of dissolved sodium nitrite. Typically, a portion of this liquor is recycled to the absorption stage and/or evaporator for recovery of additional sodium values and the balance is discarded to purge impurities from the system and thereby prevent their build-up in the evaporator and their consequent co-precipitation as impurity with the sodium nitrite crystals.

While such prior art processes enable substantially pure sodium nitrite crystals to be obtained, cheaper sources of alkaline reacting material, such as 50 percent sodium hydroxide solutions derived from electrolytic cell production of chlorine, require the purging of large amounts of draw slurry mother liquor to avoid an undesirable build-up of chloride ions in the evaporator and the consequent chloride contamination of the sodium nitrite crystals therein produced. For example, it has been found that if the draw slurry mother liquor contains greater than 5 weight percent sodium chloride, sodium chloride will coprecipitate as impurity in the sodium nitrite solids in the evaporator. Thus, the portion of the draw slurry mother liquor recycled to the absorption stage or to the evaporator should contain less than about 5 weight percent, preferably less than about 4.5 weight percent, sodium chloride so as to substantially minimize sodium chloride precipitation which greatly complicates recovery of substantially pure sodium nitrite crystals. While purging draw slurry mother liquor would be helpful in lowering the amount of sodium chloride values recycled to the absorber or evaporator, discarding substantial volumes of mother liquor is undesirable since it results in the loss of significant amounts of sodium nitrite which is dissolved in the separated draw slurry mother liquor.

While the prior art is aware of theoretical solubilities in various aqueous systems containing such salts as sodium nitrite, sodium chloride, sodium nitrate or sodium carbonate, no prior art process has been developed for removal of sodium chloride and other impurities from a 5-component aqueous system containing the sodium salts, e.g. $NaNO_2$, $NaNO_3$, $NaCl$ and $Na_2CO_3$. See, e.g., the following references: J. Bureau, *Anales de Chemise*, 78, 51–55, 103–105 and 122–139 (July and August 1937); I. N. Kuzminykh and E. L. Yakhontova, "The Solubility of Sodium Nitrite and Nitrate in Water when Soda is Present", *J. Applied Chemistry U.S.S.R.*, 24(1), 199–202 (1951); E. Erdo's and H. Simkova "Solubility of Electrolytes. The Ternary System Sodium Nitrite – Sodium Chlorine – Water ", *Collection of Czechoslav. Chem. Commun.*, 24, 503–507 (1959); E. Erdo's and H. Simkova, "The solubility of Electrolytes. The Quaternary System Sodium Nitrate – Sodium Nitrite – Sodium Chloride – Water", *Collection of Czechoslav. Chem. Commun.*, 24, 694–699 (1959); and *Mellor's Comprehensive Treatise on Inorganic and Theoretical Chemistry*, Vol. VIII, Supplement II, N (Part II), pp 370–375 (John Wiley & Sons, Inc. 1967).

SUMMARY OF THE INVENTION

According to the present invention, sodium nitrite is recovered from an aqueous sodium nitrite solution containing dissolved sodium nitrite and sodium chloride by a process which comprises subjecting said solution to crystallization in a first crystallization zone under conditions sufficient to effect crystallization of sodium chloride, including operating temperature of from about 110° to 130°C. to produce a first slurry containing sodium chloride crystals; separating said crystals from said sodium chloride slurry to produce a solution containing dissolved sodium nitrite; subjecting said sodium nitrite solution to crystallization in a second crystallization zone under conditions sufficient to effect crystallization of sodium nitrite crystals, including operating temperatures of from about 10° to 60°C, to produce a product slurry containing sodium nitrite crystals; and recovering said sodium nitrite crystals as product from said product slurry. Crystallization may be conducted by the well known "evaporative" or "vacuum methods". Evaporative crystallization, because of its relative ease of operation, is preferred in carrying out the present invention.

The sodium nitrite crystals separated from the product slurry may be sold as much or mixed with water to produce a marketable sodium nitrite solution. The liquor from which the sodium nitrite crystals are recovered may be discarded or recycled to the first crystallization zone for recovery of additional sodium nitrite therefrom. Pure sodium nitrite crystals may be admixed with crystals recovered from the product slurry to fortify the latter crystals where necessary to maintain desired sodium nitrite/sodium nitrate ratios.

The process of the present invention has been found to be particularly adapted to recovering sodium nitrite from draw slurry mother liquor containing sodium nitrite and sodium chloride produced by a process which comprises (1) absorbing nitrous gases in an aqueous alkaline solution containing sodium chloride and a member selected from the group consisting of sodium hydroxide, sodium carbonate, sodium bicarbonate and mixtures thereof to produce an aqueous solution containing dissolved sodium nitrite and sodium chloride; (2) passing the resulting sodium nitrite solution containing sodium chloride to an evaporator for evaporation of at least a portion of the water content thereof to produce a draw slurry containing sodium nitrite crystals substantially free of sodium chloride; and (3) separating the sodium nitrite crystals from the draw slurry to produce the draw slurry mother liquor containing sodium nitrite and sodium chloride which is treated by the process of the present invention to recover additional sodium nitrite therefrom. Thus, the process of the present invention is particularly adapted to the recovery of sodium nitrite from byproduct liquors resulting from the absorption of nitrous gases in an aqueous sodium hydroxide which contains NaCl, thereby permitting the use of less expensive, commercially available sodium hydroxide solutions, (such as the 50 percent sodium hydroxide solution derived from the electrolytic cell production of chlorine) as the source of the required alkaline reacting agent.

DETAILED DESCRIPTION OF THE INVENTION

According to the present invention, sodium nitrite is recovered from an aqueous solution containing dissolved sodium nitrite and sodium chloride by a process which comprises subjecting said solution to crystallization in a first crystallization zone under conditions sufficient to effect crystallization of sodium chloride, including operating temperatures of from about 110° to 130°C. to produce a first slurry containing sodium chloride crystals; separating said drystals from said first slurry to produce a liquor containing dissolved sodium nitrite; cooling said separated sodium nitrite liquor in a second crystallization zone under conditions sufficient to effect production of sodium nitrite crystals, including operating temperatures of from about 10° to 60°C. to produce a second slurry (i.e. the "product slurry") containing sodium nitrite crystals; and recovering said sodium nitrite crystals as product from said second slurry.

The aqueous solution containing dissolved sodium nitrite and sodium chloride, herein referred to as the "sodium nitrite/sodium chloride solution", which is treated in accordance with the present invention to recover sodium nitrite therefrom, may contain a wide range of sodium chloride concentrations. Typically, the sodium chloride concentration varies up to about 5 weight percent, generally from about 1 to 5 weight percent, and preferably from about 3 to 5 weight percent sodium chloride. This solution may also contain sodium nitrite in a wide range of concentrations, although sodium nitrite is generally contained therein in amounts of from about 30 to 40 weight percent, and preferably from about 34 to 40 weight percent. The aqueous sodium nitrite/sodidum chloride solution, may also contain (1) up to about 25 weight percent and generally from about 5 to 25 weight percent, with preferred concentrations of from about 10 to 20 weight percent, soduim nitrate and (2) other sodium compounds, as for example, sodium carbonate, sodium bicarbonate and/or sodium hydroxide in combined amounts up to about 5 weight percent and generally from about 0.5 to 5 weight percent.

According to the present invention, the sodium nitrite/sodium chloride solution to be treated is passed to a first crystallization zone operated under crystallization conditions, including temperatures of from 110° to 130°C., and preferably from about 120° to 130°C., to produce a first slurry containing sodium chloride crystals which is then passed to a solid separator, wherein the sodium chloride crystals are removed therefrom by conventional solid separations method, such as by filtering, centrifuging or allowing the solids to settle and decanting the liquor. The pressure at which the crystallization is conducted may be conventionally selected as that pressure which allows sodium chloride in the sodium nitrite/sodium chloride solution to crystallize out at temperatures within the above range, i.e. from about 110° to 130°C. Preferably, the pressure is atmospheric and the crystallization is evaporative. The percent of the water present in the sodium nitrite/sodium chloride solution which is removed is not critical, but generally from about 30 to 70 weight percent, preferably 40 to 60 weight percent, of the water content of this solution is removed such as by evaporation, to produce a slurry containing the sodium chloride crystals.

It has been discovered that by such a crystallization, sodium chloride crystals can be obtained which contain substantial amounts of sodium chloride and only minimal amounts of sodium nitrite and sodium nitrate. Thus, where, for example, when a sodium nitrite/sodium chloride solution comprising about 36 weight percent sodium nitrite, about 18 weight percent sodium nitrate, about 5 weight percent sodium chloride, about 2 weight percent sodium carbonate and about 40 weight percent water, is subjected to crystallization at a temperature of about 127°C., a slurry is produced containing sodium chloride crystals which comprise about 48 weight percent sodium chlorine, about 18 weight percent sodium nitrite, about 31 weight percent sodium carbonate, about 1 weight percent sodium nitrate, about 1 weight percent water and the balance (about 2 weight percent) sodium hydroxide and other components. Due to the relatively low sodium nitrite content in these crystals, they may be discarded without substantial loss of sodium nitrite values.

The solution which is obtained following separation of the sodium chloride crystals has been found to contain sodium nitrite and sodium nitrite in greater concentrations than are present in the initial sodium nitrite/sodium chloride solution which is fed to the first crystallization zone, and also to contain sodium chloride and sodium carbonate impurities in concentrations substantially less than the concentrations of these impurities in the sodium nitrite/sodium chloride solution which is fed to the first crystallization zone. Thus, for example, the solution from which the above sodium chloride crystals have been separated contains about 46 weight percent sodium nitrite, about 24 weight percent sodium nitrate, about 4 weight percent sodium chloride and about 1 weight percent sodium carbonate. Accordingly, subjecting the above sodium nitrite/sodium chloride solution to a crystallization and the subsequent removal from the crystal slurry of the precipitated sodium chloride crystals effects approximately a 30 percent increase in the sodium nitrite concentration, a 33 percent increase in the sodium nitrite concentration, and a 11 and 4 percent decrease in the concentration of sodium chloride and sodium carbonate, respectively. Of course, the precise composition of the liquor obtained following separation of the sodium chloride crystals will vary widely and will depend on the initial composition of the sodium nitrite/sodium chloride starting solution, the amount of water removed from this solution in the first crystallization zone, the final temperature of the liquor following separation of the sodium chloride solids and other factors.

The liquor from which the sodium chloride solids have been separated is passed to a second crystallization operated at lower temperatures than the first wherein the liquor is cooled to a temperature of from about 10° to about 60°C., and preferably from about 30° to 50°C., to produce a second slurry, herein termed the "product slurry", comprising essentially sodium nitrite crystals. While temperatures approaching −5°C. or lower may be employed to cool the liquor in this cooling crystallization, less desirable hydrated sodium nitrite may be precipitated which leads to scaling of the equipment. The product slurry, whose composition may vary widely depending on the composition of the liquor passed to the cooling crystallization, the temperature to which this liquor is cooled, and other factors, is then passed to a solid separator for recovery of the sodium nitrite therefrom, with the liquor so produced being discarded or recycled to the first crystallization zone for recovery of additional sodium nitrite crystals. The sodium nitrite crystals which are thereby obtained have been found to possess high concentrations of sodium nitrite, typically in quantities of up to 75 weight percent sodium nitrite and more, while containing lesser amounts of sodium nitrate, sodium chloride, and other impurities. Generally, such sodium nitrite solids should contain not more than about 20 weight percent sodium nitrate and less than about 3 weight percent sodium chloride. The solids may also contain other sodium compounds (such as sodium carbonate and sodium bicarbonate) in combined amount of up to about 2 weight percent.

These solids may be dissolved in water to produce a marketable sodium nitrite solution, that is, a solution typically containing more than 40 weight percent sodium nitrite, and less than about 15 percent sodium nitrate, and less than about 2 weight percent combined amounts of sodium chloride and other sodium compounds. The sodium nitrite solution so produced may be employed in detinning of metals, and other uses requiring sodium nitrite wherein the presence of sodium nitrate can be tolerated.

The sodium nitrite/sodium chloride solution to be treated by the process of the present invention may be obtained from a variety of sources. Preferably, however, this solution is obtained as by-product from a process in which sodium nitrite is produced by passing nitrous gases in absorbing contact with an aqueous alkaline solution containing an alkaline reacting agent, and sodium chloride. Such processes, of which those disclosed in U.S. Pat. Nos. 1,903,815 and 1,978,431 are typical, generally employ sodium hydroxide, sodium carbonate, sodium bicarbonate and mixtures thereof as the alkaline reacting agent. Especially preferred as the aqueous alkaline solution is the crude aqueous sodium hydroxide solution obtained as by-product in the electrolytic cell production of chlorine which typically contains from about 120 to 170 grams per liter, and preferably from about 130 to 150 grams per liter NaOH, and from about 160 to 190 grams per liter NaCl. Alternatively, the crude caustic liquor may be treated by standard methods to concentrate the NaOH values and to precipitate NaCl by cooling the concentrated liquor, producing a NaOH/NaCl solution containing from about 20 to 70 weight percent NaOH and up to about 2 weight percent NaCl, which may then be employed in absorbing the nitrous gases. The final absorption liquor so produced containing sodium nitrite and sodium chloride is passed to a concentrator, such as an evaporator, for removal of at least a portion of the water content of said soluton, and generally from 50 to 65 weight percent of the water in said solution, thereby producing a draw slurry generally containing from about 30 to 40 weight percent sodium nitrite crystals substantially free of other components, i.e. crystals containing less than about 1 weight percent, and preferably less than about 0.5 weight percent impurities, which may be recovered by standard solid separation techniques (such as by filtration, centrifuging or allowing the solids to settle and decanting the liquor).

The draw slurry mother liquor is obtained following the recovery of the substantially pure sodium nitrite crystals from the draw slurry and comprises a sodium nitrite/sodium chloride solution which may be treated by the process of the present invention to recover additional amounts of sodium nitrite therefrom. This liquor generally contains from about 30 to 45 weight percent, and preferably 34 to 40 weight percent sodium nitrite; up to about 25 weight percent, and generally from about 5 to 25 weight percent, with prefered concentrations of from about 10 to 20 weight percent, sodium nitrate; up to about 5 weight percent, and generally from about 1 to 5 weight percent sodium chloride; and up to about 5 weight percent, and generally from about 0.5 to 5 weight percent combined sodium carbonate, sodium bicarbonate and/or sodium hydroxide. The portion of the draw slurry mother liquor which is withdrawn and treated according to the present invention is not critical, but generally is from about 25 to 50 weight percent of the draw slurry mother liquor. The portion of this liquor that is not processed according to the present invention for removal of undesired sodium salts may be recycled to the absorber for absorption of additional nitrous gases.

It is generally desirable that the sodium nitrite/sodium nitrate weight ratio in the crystals obtained from the product slurry be at least about 2.7 to 1. Where the crystals produced from the product slurry contain sodium nitrate in excess of that amount required to satisfy the foregoing sodium nitrite/sodium nitrate ratio, substantially pure sodium nitrite crystals (e.g. sodium nitrite crystals substantially free of other components obtained as product from prior art processes producing sodium nitrite/sodium chloride solution as by-product) may be added to the sodium nitrite crystals obtained from the product slurry in accordance with the process of the present invention to fortify the sodium nitrite content of the latter solids, thereby effecting the desired sodium nitrite/sodium nitrate ratio.

The apparatus employed in producing the crystallization of sodium chloride in the first crystallization zone may be any of the standard apparatus employed to provide evaporative (in either single or multiple effects) or vacuum crystallization. Similarly, the apparatus used to cool the solution (obtained after separation of the sodium chloride crystals) to cause crystallization of the sodium nitrite values of the solution in the second crystallization zone is not critical and may be any of the standard cooling crystallizers employed to effect such cooling crystallizations.

The process of the present invention may be further illustrated by reference to the following examples wherein parts are by weight unless otherwise indicated.

EXAMPLE

An aqueous absorbing solution which is made up from an aqueous solution containing 50 percent by weight sodium hydroxide and 1 percent by weight sodium chloride and sufficient recycle liquor to prevent scaling is passed to an absorption column and a gas obtained by air oxidation of ammonia which comprises 11 volume percent nitric oxide, 17 volume percent $H_2O$, 3 volume percent $O_2$ and 69 volume percent nitrogen, and at a temperature of 400°C. is sparged into the liquid.

A final absorption liquor is withdrawn from the absorption column and is found to contain 40 weight percent sodium nitrite, 8 weight percent sodium nitrate, 2 weight percent sodium chloride, 1 weight percent sodium carbonate and 49 weight percent water. The final absorption liquor is fed to a multiple effect evaporator crystallizer which is operated to produce a draw slurry having a temperature of about 60°C, and which contains about 35 weight percent solids. The draw slurry is then filtered to remove solids of substantially pure sodium nitrite therefrom, thereby resulting in a draw slurry mother liquor which contains 36 weight percent sodium nitrite, 18 weight percent sodium nitrate, 4.5 weight percent sodium chloride, 2.0 weight percent sodium carbonate and 39.5 weight percent water and minor impurities. This liquor, which contains too much sodium chloride to be sold as sodium nitrite mother liquor or to be continually recycled to the absorption step or to the first evaporator crystallizer, is then subjected to evaporative crystallization in a second evaporator wherein water is removed until the boiling point of the liquor has reached about 127°C, thereby producing a slurry containing about 5 weight percent solids. This slurry is passed to a centrifuge for recovery of solids which are found to comprise 48 weight percent sodium chloride, 31 weight percent sodium carbonate, 18 weight percent sodium nitrite, 1 weight percent sodium nitrate, and about 2 weight percent water. The liquor is found to contain about 46 weight percent sodium nitrite, 24 weight percent sodium nitrate, 4 weight percent sodium chloride, 1 weight percent sodium carbonate and 25 weight percent water, and is passed to a vessel wherein the liquor is subjected to a cooling crystallization by cooling the liquor to a temperature of about 40°C., resulting in a product slurry containing about 36 weight percent crystals. This slurry is then passed to a centrifuge wherein the crystals containing about 75 weight percent sodium nitrite, about 20 weight percent sodium nitrate, about 2 weight percent sodium chloride, and about 0.1 weight percent sodium carbonate are obtained. The crystals separation step also produces a depleted liquor containing about 30 weight percent sodium nitrite, 25 weight percent sodium nitrate, 4 weight percent sodium chloride, 2 weight percent sodium carbonate and 39 weight percent water.

The sodium nitrite crystals separated from the product slurry are then passed to a separate vessel wherein the solids are dissolved in water to produce sodium nitrite product solution containing 40 weight percent sodium nitrite, 11 weight percent sodium nitrate and 1 weight percent sodium chloride.

Since certain changes may be made in carrying out the above process without departing from the scope of the invention, it is intended that all matter contained in the above description shall be interpreted as illustrative and not in a limiting sense.

We claim:

1. A process for recovering sodium nitrite from an aqueous solution containing dissolved therein sodium nitrite and sodium chloride which comprises: subjecting said aqueous solution to crystallization in a first crystallization zone under conditions sufficient to effect crystallization of sodium chloride from said solution, including operating temperatures of from about 110° to 130°C, to form a first slurry containing sodium chloride crystals; separating said sodium chloride crystals from said first slurry to form a solution containing dissolved sodium nitrite; subjecting said sodium nitrite solution to crystallization in a second crystallization zone under conditions sufficient to effect crystallization of sodium nitrite from said solution, including operating temperatures of from about 10° to 60°C, to form a second slurry containing sodium nitrite crystals; and recovering said sodium nitrite crystals from said second slurry.

2. The process according to claim 1 wherein said aqueous solution contains dissolved therein from about 30 to 45 weight percent sodium nitrite and from about 1 to 5 weight percent sodium chloride.

3. The process according to claim 1 wherein the crystallization in said first crystallization zone is conducted at temperatures of from about 120° to 130°C.

4. The process according to claim 1 wherein the crystallization in said second crystallization zone is conducted at temperatures of from about 30° to 50°C.

5. The process according to claim 1 wherein at least a portion of the liquor produced following recovery of the sodium nitrite crystals is recycled to the first crystallization zone for recovery of additional sodium nitrite therefrom.

6. The process according to claim 1 wherein said aqueous solution containing dissolved sodium nitrite and sodium chloride is produced by a process which comprises:
   a. contacting a nitrous gas with an aqueous alkaline solution containing sodium chloride under conditions sufficient to produce an aqueous solution containing dissolved sodium nitrite and sodium chloride;
   b. concentrating said solution by removing at least a portion of the water conntent of said solution to produce a slurry containing sodium nitrite crystals substantially free of sodium chloride; and
   c. removing said substantially sodium-chloride-free sodium nitrite crystals from said slurry and recovering an aqueous solution containing dissolved sodium nitrite and sodium chloride.

7. The process according to claim 6 wherein said aqueous alkaline solution in addition to sodium chloride contains a member selected from the group consisting of sodium hydroxide, sodium carbonate, sodium bicarbonate and mixtures thereof.

8. The process according to claim 6 wherein said aqueous alkaline solution comprises an aqueous solution containing sodium hydroxide in an amount of from about 40 to 60 percent by weight and sodium chloride in an amount of from about 1 to 2 percent by weight.

9. The process of claim 6 wherein said aqueous alkaline solution is obtained as by-product in the production of chlorine by electrolytic decomposition of sodium chloride.

10. The process according to claim 1 wherein the sodium nitrite crystals contain a mixture of sodium nitrite and sodium nitrate in a sodium nitrite to sodium nitrate weight ratio of at least about 2.7 to 1.

* * * * *